United States Patent
Remer et al.

(10) Patent No.: US 7,086,059 B2
(45) Date of Patent: Aug. 1, 2006

(54) THROTTLING QUEUE

(75) Inventors: Eric B. Remer, American Fork, UT (US); David A. King, Highland, UT (US)

(73) Assignee: Intel Corporation, Santa Clara, CA (US)

( * ) Notice: Subject to any disclaimer, the term of this patent is extended or adjusted under 35 U.S.C. 154(b) by 934 days.

(21) Appl. No.: 09/894,162

(22) Filed: Jun. 26, 2001

(65) Prior Publication Data

US 2002/0196799 A1    Dec. 26, 2002

(51) Int. Cl.
*G06F 9/50* (2006.01)

(52) U.S. Cl. ............................. 718/103; 709/226

(58) Field of Classification Search ........ 718/100–103; 709/201

See application file for complete search history.

(56) References Cited

U.S. PATENT DOCUMENTS

| | | | | |
|---|---|---|---|---|
| 5,339,425 A | * | 8/1994 | Vanderah et al. | 718/102 |
| 5,515,379 A | * | 5/1996 | Crisler et al. | 370/347 |
| 5,987,492 A | * | 11/1999 | Yue | 718/102 |
| 6,108,347 A | * | 8/2000 | Holmquist | 370/458 |
| 6,243,391 B1 | * | 6/2001 | Holmquist | 370/458 |
| 6,366,761 B1 | * | 4/2002 | Montpetit | 455/12.1 |
| 6,560,628 B1 | * | 5/2003 | Murata | 718/103 |
| 6,594,263 B1 | * | 7/2003 | Martinsson | 370/395.42 |
| 6,633,897 B1 | * | 10/2003 | Browning et al. | 718/103 |

* cited by examiner

*Primary Examiner*—Lewis A. Bullock, Jr.
(74) *Attorney, Agent, or Firm*—Blakely, Sokoloff, Taylor & Zafman LLP

(57) ABSTRACT

A method of processing work units in a system is achieved using a throttling queue. The throttling queue assigns work units to a predetermined number of processing slots. Each slot processes an assigned work unit, sends the work units to client systems for processing, and upon finishing, works on a subsequent work unit. The predetermined number of slots, in one embodiment, may be scaled as resources are added or removed from the system. In one embodiment, the work units are network data packets.

11 Claims, 5 Drawing Sheets

THROTTLING QUEUE

FIELD

The described invention relates to the field of processing network data. In particular, the invention relates to the management of processing resources, such as in a networked environment.

BACKGROUND

Throttling typically refers to controlling the amount of work processed in a system per some time period. For example, if data is being sent over a network, how fast that data is sent is throttled to avoid data loss or to allow other data to flow simultaneously. Throttling traditionally has been implemented by queuing up work units and processing them in the order they are received. This approach, however, doesn't reflect changes in available resources, such as where it is possible to concurrently process data, or reflect changes in priority.

DETAILED DESCRIPTION

A method of processing work units in a system using a throttling queue is disclosed. A throttling queue is a device that manages assignment of work units to clients, as will be described. The throttling queue may be implemented in hardware or software. In one embodiment, a throttling queue may assign work units or objects to a predetermined number of processing slots. A processing slot processes an assigned work unit in this embodiment, and upon finishing, works on another assigned work unit. The predetermined number of slots, in one embodiment, may be scaled as resources are added or removed from the system.

Figure 1:
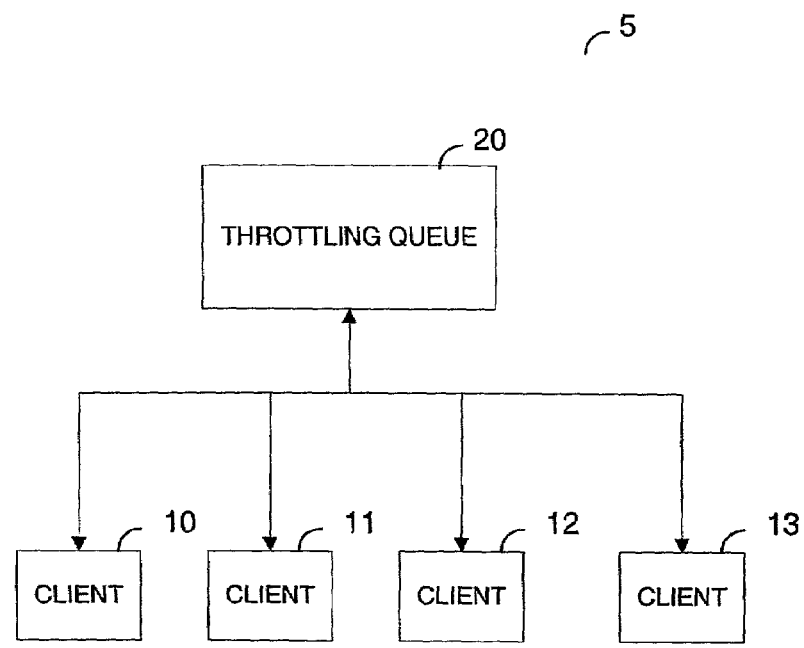
FIG. 1 is a block diagram that shows an example of a throttling queue in a system.

FIG. 1 is a block diagram that shows an example of a throttling queue 20 in a system 5. In one embodiment, the throttling queue 20 is implemented in software on a hardware platform. Clients 10–13 may register with the throttling queue. Thereafter, the clients 10–13 send work units to the throttling queue 20. Work units are work requests that are sent to different agents (or clients) to process. In one embodiment, a work unit may comprise a networking data packet. However, the work unit may be any request for processing of data. In one embodiment, the clients 10–13 comprise separate computing platforms that are networked together.

In one embodiment, a user operating on one of the clients is able to make modifications on the other clients. During this process, a number of work units are generated by the clients and stored in the throttling queue for transmission to the intended agent (or client). The throttling queue, in this embodiment, has a predetermined number of processing slots for processing the generated work units. As the work units are processed, for example, by the work units being sent out to other clients, such as 10–13, slots are freed up. Subsequent work units may now fill the freed up slots.

Figure 2:
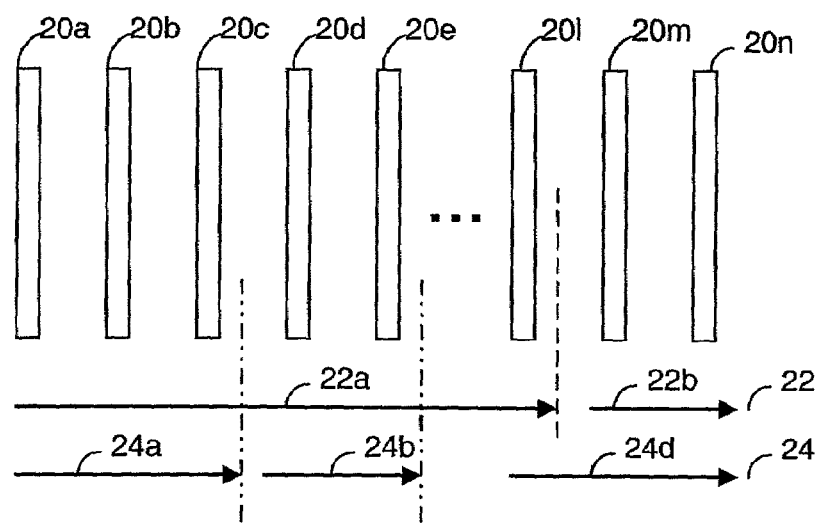
FIG. 2 is a schematic diagram that shows an example embodiment of a throttling queue that includes processing slots.

FIG. 2 is a schematic diagram that shows an example embodiment of a throttling queue that includes processing slots 20a–20n. In one embodiment, a first allocation of processing slots 22 illustrates a first client is allotted a certain number of slots as depicted by allocation line 22a. Line 22a indicates that a first client is assigned slots 20a–20l. A second client is assigned slots 20m and 20n, as depicted by line 22b. Such an uneven allocation of slots is used when one client is given more priority than another client. In one embodiment, the client with the highest priority is allocated 80% of the slots, and any other clients share the remaining 20% of slots. Of course these allocations are only an example, various other percentages may be employed. Multiple priority levels and other variations may also be employed.

In a different allocation 24, each of the clients is assigned the same number of slots. For example, allocation lines 24a–24d illustrate various clients assigned three corresponding processing slots. Line 24a corresponds to slots 20a–20c, line 24b corresponds to slots 20d–f, and so forth.

In one embodiment, the assignment of processing slots may be based at least in part on threads of a single client. Thus, a multithreading client is able to prioritized certain threads above others.

In one embodiment, the throttling queue has a stack, i.e., a last-in first-out storage medium, for clients that have registered to use it. If a client sends the throttling queue a higher priority request, then the throttling queue "pushes" the current client request on a stack and then begins processing the new client request.

Figure 3:
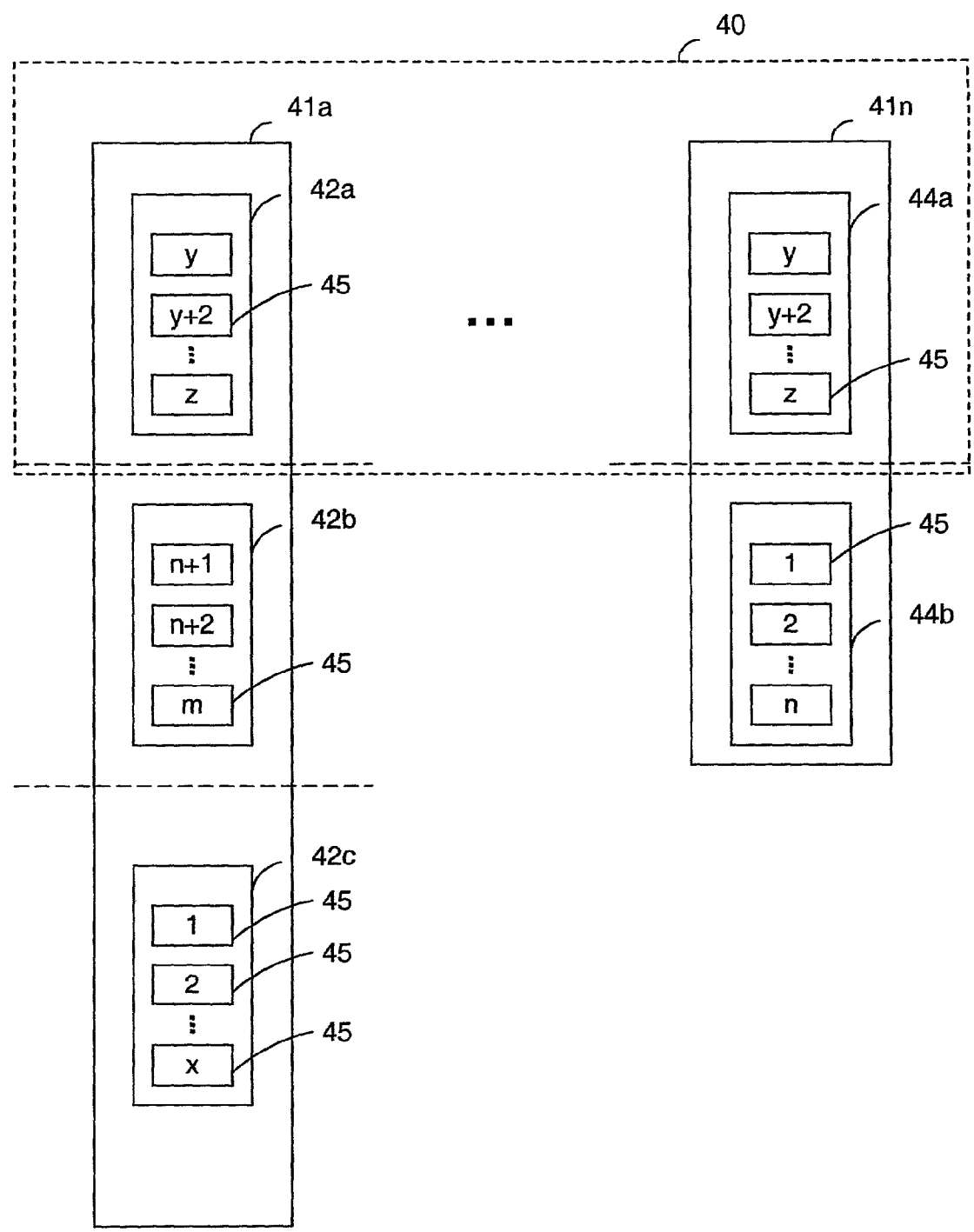
FIG. 3 is a schematic diagram that shows an example embodiment with client stacks being employed within a throttling queue.

FIG. 3 is a schematic diagram that shows an example embodiment with client stacks 41a–41n being employed within a throttling queue. The client stacks, may have a number of queues 42a–c, 44a–b, i.e., storage media that are typically implemented using a first-in first-out protocol, such that the respective first data items stored into the storage media are the respective first items retrieved from the storage media. The queues 42a–c, 44a–b have a number of work units represented by objects 45. The top elements of the client stacks form the primary queue 40. The client queues of the primary queue are processed by work units being allocated to slots as described with respect to FIG. 2. As the client queues 42a, 44a complete processing in the primary queue 40, other client queues 42b–c, 44b are popped off the stack to be processed.

For example, client stack 41a includes client queues 42a–c. In one embodiment, each of the client queues 42a–c has a priority associated with it. The one with the highest priority is the one that is processed first. After client queue 42a is processed, client queue 42b is processed. Subsequently, client queue 42c is processed. At the same time a separate client stack 41n is being processed, and after its client queue 44a finishes processing, then client queue 44b enters the primary queue and its work units are allocated to the processing slots.

In one embodiment, some work units may have a dependency on other work units deeper in the client stack. When this occurs, the work units deeper in the client stack are brought to the top of the stack so they can be processed, as will be explained with respect to FIG. 5.

Figure 4:
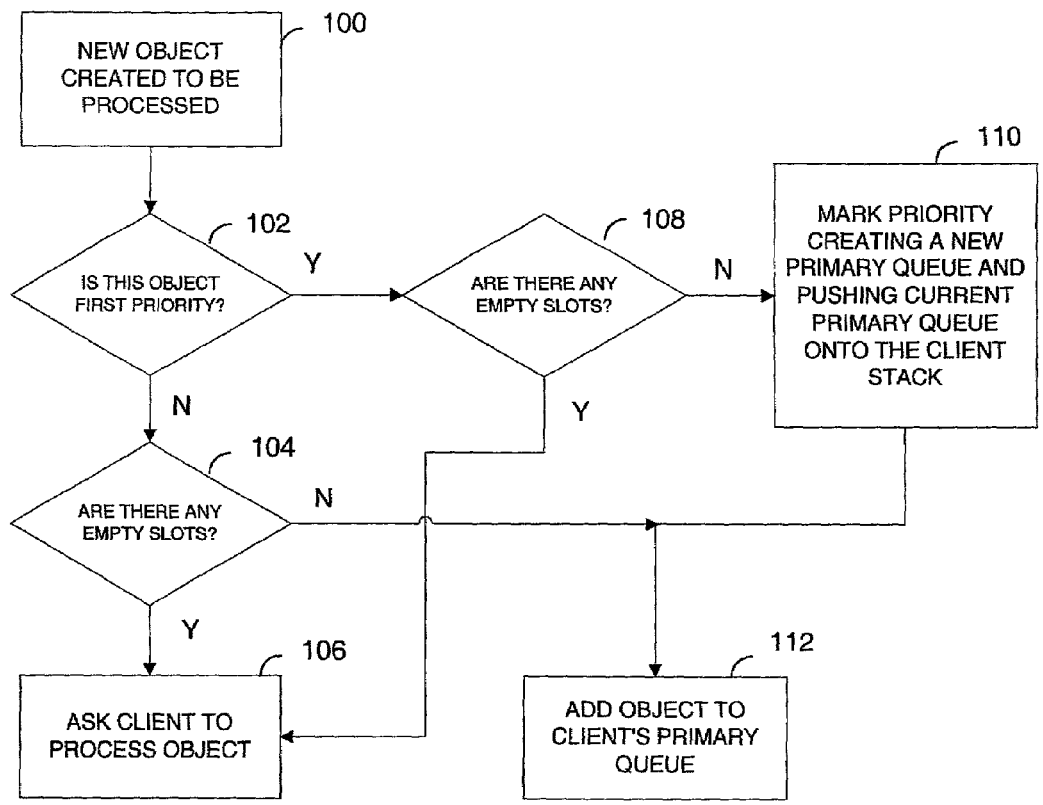
FIG. 4 is a flowchart that shows one embodiment of a technique to add work units or objects to a throttling queue.

FIG. 4 is a flowchart that shows one embodiment of a technique to add work units or objects to a throttling queue. The flow starts at block 100, at which, a new object (representing a work unit) is created that needs processing. Process flow continues at block 102, at which a determination is made whether this object has a first priority. In one embodiment, the client that created the new object dictates whether the new object should have a higher priority than other objects. If the object does not have a first priority, then process flow continues at block 104. If there are empty slots, then process flow continues at block 106 at which the object is assigned to the appropriate target client(s) for processing.

At block 102, if the new object has first priority, then process flow continues at block 108. From block 108, if there are empty slots, then the object is processed and assigned to the appropriate target client(s) for processing at block 106. From block 108, if there are no empty slots, then process flow continues at block 110, at which a change in priority is marked by creating a new primary queue and pushing the current primary queue onto the client stack. From block 110, process flow continues at block 112 at which the new object (representing a work unit) is added to the client's primary queue.

At block 104, if there are no empty slots, then process flow continues at block 112, at which the new object (representing a work unit) is added to the client's primary queue.

Figure 5:
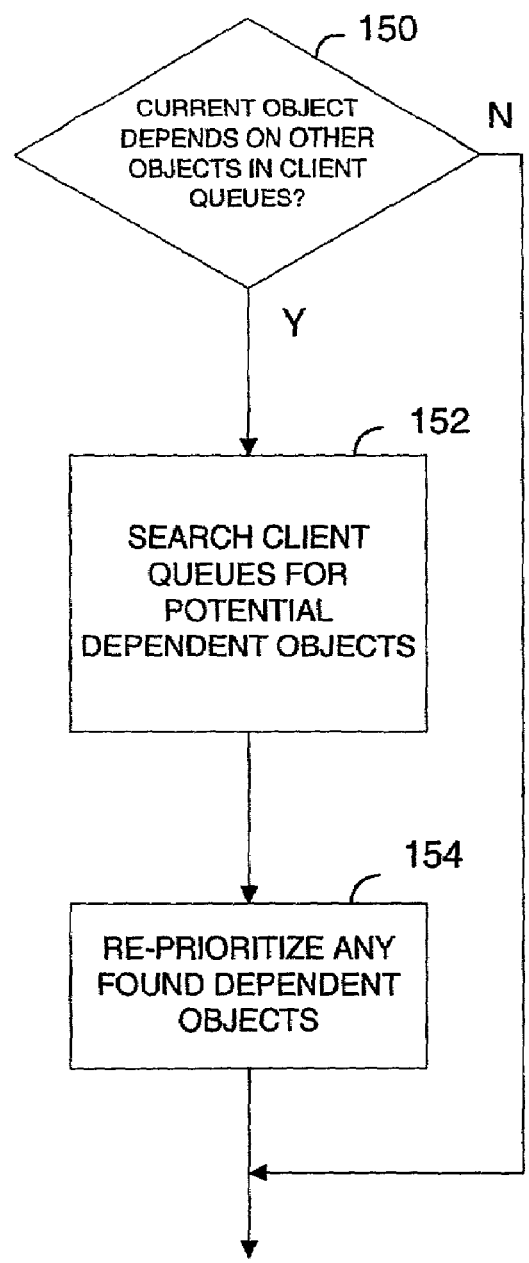
FIG. 5 is a flowchart that shows one embodiment of a technique to add an object or work unit to a throttling queue where that object depends on another object already in the throttling queue.

FIG. 5 is a flowchart that shows one embodiment of a technique to add an object or work unit to a throttling queue where that object that depends on another object already in the throttling queue. In one embodiment, block 112 of FIG. 4 comprises FIG. 5.

The flowchart starts at block 150 at which a determination is made whether the current object to be added to the throttling queue depends on other objects already in the throttling queue. If there is a potential dependency, then the flow proceeds at block 152, at which the client queues are searched for potential dependent objects. Any dependent objects found are elevated to high priority (block 154).

In one embodiment, single objects from the client queue are elevated in priority. In another embodiment, an entire client queue may be raised in priority based on a dependent object within the client queue.

As an example, a client may send work units to multiple computing platforms as a result of interactions with a first web page. When the client switches to a second web page, this second web page may be set up to modify a single target computing platform. In such a case, the client signals the throttling queue to re-prioritize work units already in the client stacks directed to the target computing platform.

Figure 6:
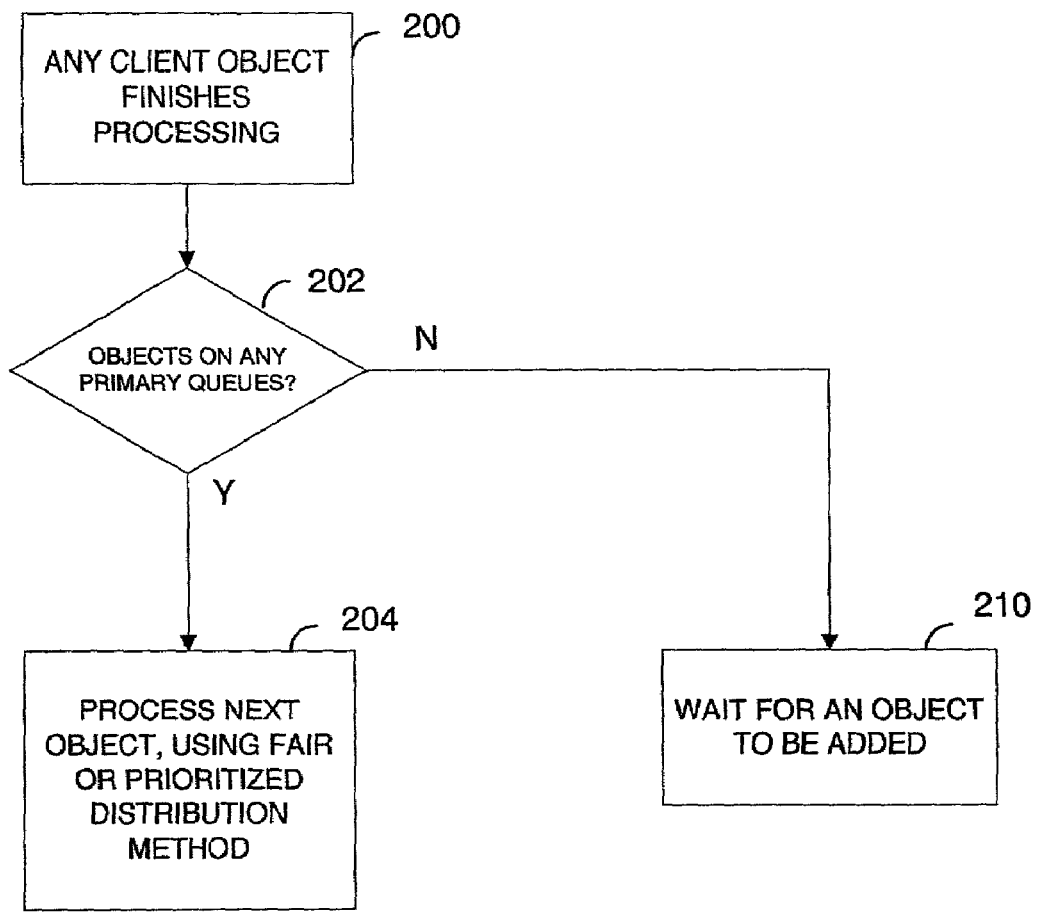
FIG. 6 is a flowchart that shows one embodiment of a technique to remove work units or objects from a throttling queue.

FIG. 6 is a flowchart that shows one embodiment of a technique to remove objects or work units from a throttling queue. The process flow starts at block 200, at which any of the client objects finishes processing. The process flow continues at block 202, at which a determination is made whether there are any objects in any primary queues. If there are objects in any of the primary queues, then process flow continues at block 204, at which a next object is processed. In one embodiment, either a fair distribution method or a prioritized distribution method is employed, as was illustrated with respect to FIG. 2.

If, at block 202, there are no objects in any of the primary queues, then process flow continues at block 210, at which the throttling queue waits for a new object to be added.

The above throttling queue may be employed in a variety of different systems. In one embodiment, multiple clients are coupled together via a network, and the clients are able to modify other clients on the network. In one embodiment, a client may generate thousands of messages, e.g., packet data, to send out to the other computing platforms on the network. However due to limited bandwidth of the network, it may take a while to communicate all the messages (work units) to the other clients. The method described herein allows the client to work on subsequently received tasks by prioritizing the newer tasks with higher priority. The older tasks either continue to operate with a lower priority by being allocated to fewer slots or the older tasks may wait on a client stack until the current tasks are completed. The various implementations may be based on different priority levels of the system.

In one embodiment, for example, the throttling queue may regulate processing requests for a browser. For example, if a client using a browser is receiving data from a first web page, and the client changes to a second web page, the client will generate new work units based on receiving data from the second web page. Assume the work units associated with the second web page have a higher priority. In this embodiment, these will be processed first. The work units associated with the first web page are then placed in a client stack of the throttling queue and will either continue processing in the background (e.g., at a lower priority) or wait on the client stack until the work units associated with the second web page complete.

Thus, a method of processing work units in a system using a throttling queue is disclosed. However, the specific embodiments and methods described herein are merely illustrative. Numerous modifications in form and detail may be made without departing from the scope of the invention as claimed below. The invention is limited only by the scope of the appended claims.

What is claimed is:

1. A method comprising:
    allocating a plurality of processing slots based on respective priorities of client computing platforms networked together, wherein allocating includes providing a higher number of the plurality of processing slots to high priority client computing platforms, and providing a lower number of the plurality of processing slots to low priority client computing platforms;
    assigning work units to the plurality of processing slots, the work units having object priority levels associated with them as determined by the client computing platforms when assigning work units to the processing slots;
    sending the work units to the client computing platforms for processing in accordance with the allocation of the plurality of processing slots; and
    processing the work units in accordance with the associated object priority levels.

2. The method of claim 1, further comprising:
    pushing the work units onto a client stack based on the object priority levels.

3. The method of claim 1, wherein a predetermined number of the plurality of processing slots approximately corresponds to a predetermined portion of the plurality of processing slots, and the plurality of processing slots varies based at least in part on availability of resources.

4. The method of claim 1, wherein the work units comprise network data packets.

5. The method of claim 1, further comprising re-prioritizing a first work unit in the client stack based at least in part on a second work unit being at least partially dependent upon the first work unit.

6. A machine-readable medium having stored thereon data representing sets of instructions which, when executed by a machine, cause the machine to:
allocate a plurality of processing slots based on respective priorities of client computing platforms, wherein allocating includes providing a higher number of the plurality of processing slots to high priority client computing platforms, and providing a lower number of the plurality of processing slots to low priority client computing platforms;
assign work units to the plurality of processing slots, the work units having object priority levels associated with them as determined by the client computing platforms when assigning work units to the processing slots;
send the work units to the client computing platforms for processing in accordance with the allocation of the plurality of processing slots; and
process the work units in accordance with the associated object priority levels.

7. The machine-readable medium of claim 6, wherein sets of instructions, when executed by the machine, further cause the machine to:
push the work units onto a client stack based on the object priority levels.

8. The machine-readable medium of claim 6, wherein sets of instructions, when executed by the machine, further cause the machine to re-prioritize a first work unit in the client stack based at least in part on a second work unit being at least partially dependent upon the first work unit.

9. A system comprising:
a plurality of processing slots being allocated based on respective priorities of client computing platforms, wherein allocating includes providing a higher number of the plurality of processing slots to high priority client computing platforms, and providing a lower number of the plurality of processing slots to low priority client computing platforms;
a throttling queue to assign work units to the plurality of processing slots, the work units having object priority levels associated with them as determined by the client computing platforms when assigning work units to the processing slots;
the plurality of processing slots to send the work units to the client computing platforms for processing in accordance with the allocation of the plurality of processing slots; and
the client computing platforms to process the work units in accordance with the associated object priority levels.

10. The system of claim 9, wherein a predetermined number of the plurality of processing slots approximately corresponds to a predetermined portion of the plurality of processing slots, and the plurality of processing slots varies based at least in part on availability of resources.

11. The system of claim 9, wherein the work units comprise network data packets.

* * * * *